US008509755B2

(12) United States Patent
Dods et al.

(10) Patent No.: US 8,509,755 B2
(45) Date of Patent: Aug. 13, 2013

(54) SYSTEM AND METHOD FOR ACTIVATING A COMPONENT ON AN ELECTRONIC DEVICE

(75) Inventors: Jeffrey Alton Hugh Dods, Kitchener (CA); Nazih Almalki, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 737 days.

(21) Appl. No.: 12/609,575

(22) Filed: Oct. 30, 2009

(65) Prior Publication Data

US 2011/0105096 A1   May 5, 2011

(51) Int. Cl.
*H04M 3/00* (2006.01)
*H04B 1/38* (2006.01)

(52) U.S. Cl.
USPC .......................................... 455/418; 455/574

(58) Field of Classification Search
USPC ..................... 379/433.01; 455/418
See application file for complete search history.

(56) References Cited

U.S. PATENT DOCUMENTS

| 5,996,080 | A | 11/1999 | Silva et al. |
| 6,255,962 | B1 | 7/2001 | Tanenhaus et al. |
| 6,469,639 | B2 | 10/2002 | Tanenhaus et al. |
| 7,084,762 | B2 | 8/2006 | Pedrazzini et al. |
| 2003/0133432 | A1* | 7/2003 | Moerder ........................ 370/342 |
| 2007/0075965 | A1 | 4/2007 | Huppi et al. |
| 2007/0102525 | A1* | 5/2007 | Orr et al. .................. 235/472.01 |
| 2008/0008313 | A1* | 1/2008 | Fyke ........................ 379/433.01 |

FOREIGN PATENT DOCUMENTS

| EP | 1785808 A1 | 5/2007 |
| EP | 1818757 A1 | 8/2007 |

* cited by examiner

*Primary Examiner* — Michael Faragalla
(74) *Attorney, Agent, or Firm* — McCarthy Tétrault LLP (57) ABSTRACT

The disclosure describes a system and method for activating an electronic device from a low power state. The method comprises: monitoring a motion detection circuit for a signal indicating a movement of the device; analyzing the movement of the device and if the movement matches a profile for an activation movement for the device then activating a component on the device; and if the movement does not match the profile, then monitoring for additional movement signals for the device and providing data relating to the additional movement signals to a microprocessor in the device at an instance where the microprocessor is expected to be monitoring for receipt of a synchronization signal from a network in communication with the device is expected and when the instance is passed, the device is placed in second power operating mode, the second power operating mode consuming less power than the first power operating mode.

17 Claims, 5 Drawing Sheets

SYSTEM AND METHOD FOR ACTIVATING A COMPONENT ON AN ELECTRONIC DEVICE

The disclosure described herein relates to a system and method for selectively activating electronic elements on an electronic device. In particular, the disclosure herein relates to activating the device from a low-power state by detecting a notable movement of the device, then determining whether an input device has been activated, then selectively activating or re-activating components in the device.

BACKGROUND OF THE DISCLOSURE

Current wireless handheld mobile communication devices perform a variety of functions to enable mobile users to stay current with information and communications, such as e-mail, corporate data and organizer information while they are away from their desks. A wireless connection to a server allows a mobile communication device to receive updates to previously received information and communications. The handheld devices optimally are lightweight, compact and have long battery life. In order to conserve power consumption of the devices, "sleep" modes are provided which selectively either slows down the clocking rate of the components, selectively de-activate components, or both. Current algorithms are provided which selectively activate one or more components depending on a detected movement of the device. However, such algorithms may activate such components too frequently, thereby causing excessive drain on the battery of the device.

There is a need for a system and method which addresses deficiencies in the prior art.

BRIEF DESCRIPTION OF THE DRAWINGS

The disclosure provides, by way of example only, with reference to the accompanying drawings, in which.

DETAILED DESCRIPTION OF AN EMBODIMENT

The description which follows and the embodiments described therein are provided by way of illustration of an example or examples of particular embodiments of the principles of the present disclosure. These examples are provided for the purposes of explanation and not limitation of those principles and of the disclosure. In the description which follows, like parts are marked throughout the specification and the drawings with the same respective reference numerals.

In a first aspect, a method for controlling activation of a component on an electronic device is provided. The method comprises: in a movement processing state, monitoring a motion detection circuit in the device for a signal indicating a movement of the device; and analyzing the movement of the device and if the movement matches a profile for an activation movement for the device then activating a component on the device; and if the movement does not match the profile, then after a timer condition, in a lockstep state, monitoring for additional movement signals for the device and providing data relating to the additional movement signals to a microprocessor in the device at an instance where the microprocessor is expected to be conducting a separate operation in a first power operating mode.

In the method, the instance is when receipt of a synchronization signal from a network in communication with the device is expected and when the instance is passed, the device may be placed in second power operating mode, where the second power operating mode consuming less power than the first power, operating mode.

The method may further comprise: prior to being in the processing state, monitoring for an activation event that represents an activation activity for the device in a dormant state.

In the method, the dormant state may have been entered when the device was either turned off, placed in a holster or connected to a docking station.

In the method, the activation event may be one of activation of a key on the device, detection of removal of the device from a holster or detection of removal of the device from a docking station.

In the method, the profile for the activation movement may be an upwards movement of the device from a resting position. Other profile(s) may be used.

The method may further comprise: after activating the component on the device, in a monitoring-disabled state monitoring for deactivation of the component; and upon detection deactivation of the component, changing the motion detection circuit to send movement data only when the movement data exceeds a predefined threshold.

In the method, the component may be a backlight for a display on the device.

In the method, the movement processing state may further comprise: after changing the motion detection circuit to send movement data only when the movement data exceeds a predefined threshold, monitoring for movement data detected by the motion detection circuit; upon detecting a movement that exceeds the predefined threshold, monitoring for movement data detected by the motion detection circuit that matches the profile for the activation movement for the device; and if no match of the profile for the activation movement for the device is detected within a timeframe and no signal to deactivate the device is received, then monitoring for additional movement signals for the device and providing data relating to the additional movement signals at an instance where the microprocessor is expected to be operating at in a non-low power operating mode.

The method may further comprise: after detecting deactivation of the component, in a ready state monitoring for an initial movement of the device and setting the motion detection circuit to send movement data only when the movement data exceeds a predefined threshold.

The method may further comprise, from the ready state: after detecting the initial movement of the device and setting the motion detection circuit to stream movement data; and moving to the processing state.

In a second aspect, a method for controlling activation of a component on an electronic device is provided. The method comprises: monitoring a motion detection circuit for a signal indicating a movement of the device; analyzing the movement of the device and if the movement matches a profile for an activation movement for the device then activating a component on the device; and if the movement does not match the profile, then monitoring for additional movement signals for the device and providing data relating to the additional movement signals to a microprocessor in the device at an instance where the microprocessor is expected to be monitoring for receipt of a synchronization signal from a network in communication with the device is expected and when the instance is passed, the device is placed in second power operating mode, the second power operating mode consuming less power than the first power operating mode.

The method may further comprise when the device is in a dormant state, prior to the monitoring for the signal indicating the movement of the device, monitoring for an activation event that represents an activation activity for the device.

In the method, the dormant state may have been entered when the device was either turned off, placed in a holster or connected to a docking station.

In the method, the activation event may be one of activation of a key on the device, detection of removal of the device from a holster or detection of removal of the device from a docking station.

In the method, the profile for the activation movement may be an upwards movement of the device from a resting position.

In a third aspect, a power management system for an electronic device is provided. The system comprises: a microprocessor; a motion detection circuit having a microcontroller; a power management software operating on the device to place the microprocessor from a low power state where a component of the electronic device is not activated to a higher power state where the component is activated, based on movement data from the motion detection circuit. In the system the power management software provides movement data collected by the motion detection circuit at an activity instance where the microprocessor is expected to be operating at in a non-low power operating mode and the device is conducting a network function.

In the system, the movement data may be provided with a request signal to an interrupt input line of the microprocessor at the activity instance.

In the system, the network function may be monitoring for a receipt of a synchronization signal from the network.

In the system, the power management software may: provide commands to the microcontroller to provide data received from the microcontroller to provide the movement data either without filtering or with filtering depending on what mode the power management software in currently operating in.

In a fourth aspect, a system for controlling activation of a component on an electronic device is provided. The system comprises: a microprocessor; a motion detection circuit having a microcontroller; a power management software operating on the device. The software operates in several states to control the power levels of the device. The states include: a movement processing state and a lockstep state. The movement processing state monitors the motion detection circuit for a signal indicating a movement of the device; and analyzes the movement of the device and if the movement matches a profile for an activation movement for the device then activates a component on the device; and if the movement does not match the profile, then after a timer condition, the software moves to the lockstep state. In the lockstep state, the software monitors for additional movement signals for the device and provides data relating to the additional movement signals to a microprocessor in the device at an instance where the microprocessor is expected to be conducting a separate operation in a first power operating mode.

In the software, the instance is when receipt of a synchronization signal from a network in communication with the device is expected and when the instance is passed, the device may be placed in second power operating mode, where the second power operating mode consuming less power than the first power operating mode.

In the software, a dormant state may be provided. Prior to being in the processing state, the software may be in the dormant state where it monitors for an activation event that represents an activation activity for the device.

In the software, the dormant state may have been entered when the device was either turned off, placed in a holster or connected to a docking station.

In the software, the activation event may be one of activation of a key on the device, detection of removal of the device from a holster or detection of removal of the device from a docking station.

In the software, the profile for the activation movement may be an upwards movement of the device from a resting position.

The software may further comprise a monitoring-disabled state. After activating the component on the device, the monitoring-disabled state may monitor for deactivation of the component; and upon detection deactivation of the component, may change the motion detection circuit to send movement data only when the movement data exceeds a predefined threshold.

In the system, the component may be a backlight for a display on the device.

The movement processing state may further comprise: after changing the motion detection circuit to send movement data only when the movement data exceeds a predefined threshold, monitoring for movement data detected by the motion detection circuit; upon detecting a movement that exceeds the predefined threshold, monitoring for movement data detected by the motion detection circuit that matches the profile for the activation movement for the device; and if no match of the profile for the activation movement for the device is detected within a timeframe and no signal to deactivate the device is received, then monitoring for additional movement signals for the device and providing data relating to the additional movement signals at an instance where the microprocessor is expected to be operating at in a non-low power operating mode.

The software may further comprise a ready state. In the ready state, after detecting deactivation of the component, the software may monitor for an initial movement of the device and setting the motion detection circuit to send movement data only when the movement data exceeds a predefined threshold.

From the ready state, after detecting the initial movement of the device, setting the motion detection circuit to stream movement data; and moving to the processing state.

In other aspects, various combinations of sets and subsets of the above aspects are provided.

Generally, an embodiment provides a system and method of placing an electronic device into a lower power "sleep" mode, where one or more components in the device is deactivated and then selectively transiting the electronic device into higher power mode(s) depending on a detected motions or movements of the device. Movement filters and state filters may be imposed when evaluating when to transit the device from one state to another. One filter may be provided to ignore detected movement signals that are below a predetermined threshold before activating a component on the device. Another filter is to process movement signals (or monitor for movement signals) during certain operating states of the device. An embodiment may process those movement signals only during certain operating states of the device. Such operating states may be associated with a condition where the device operates in a higher power mode. For a wireless communication device, such a condition may include periods when the device is programmed to transmit or monitor for receipt of a synchronization or communication signal from a network.

Exemplary details of aspect of embodiments are provided herein. First, a description is provided on general concepts and features of an embodiment as provided in a device. Then, further detail is provided on the system, data and algorithms used to process detected movements of a device and to processing the detected movements at certain times or intervals to take advantage of a current operating condition of the device.

Figure 1:
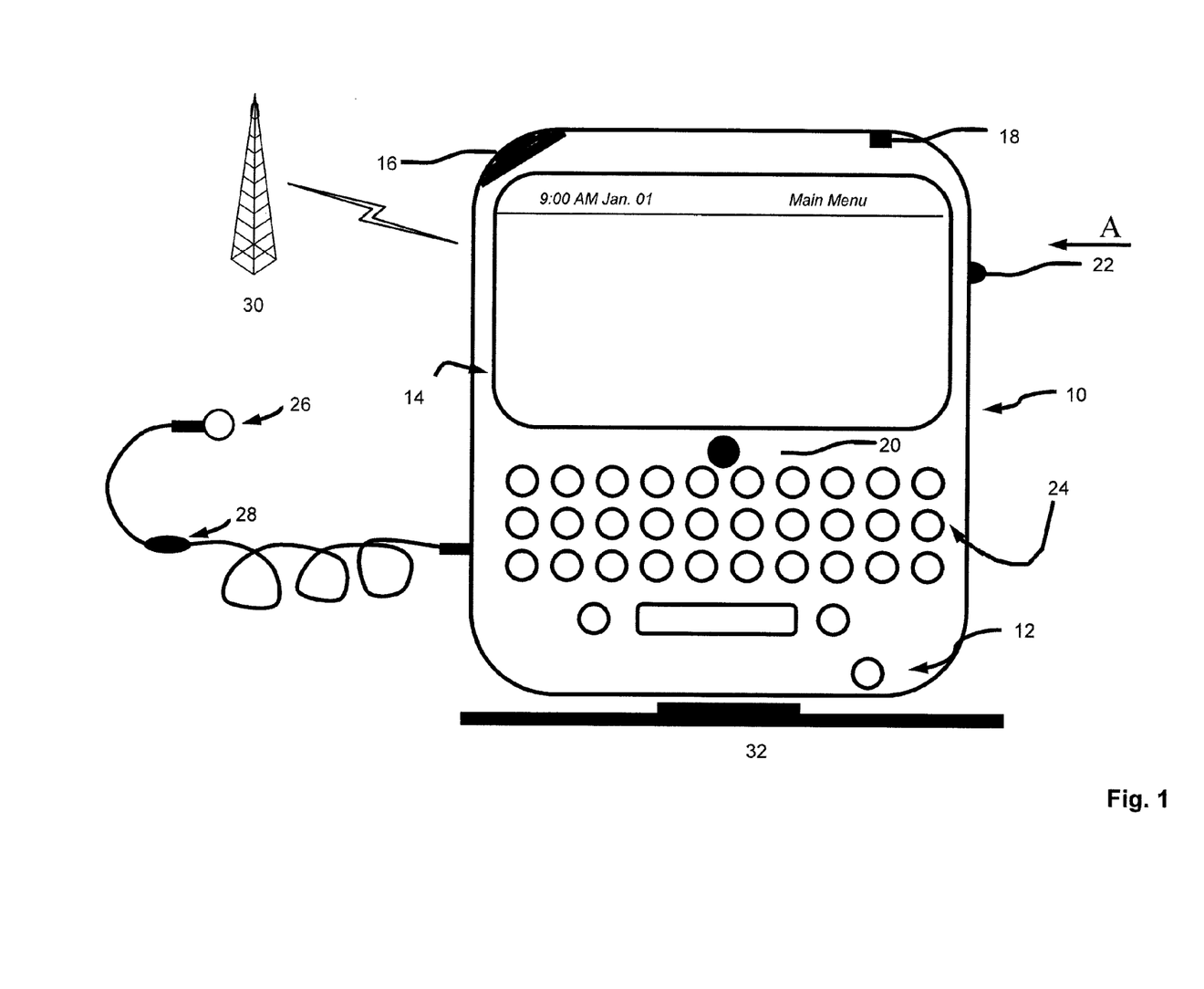
FIG. 1 is a schematic representation of an electronic device having a motion detection system in accordance with an embodiment.
Figure 2:
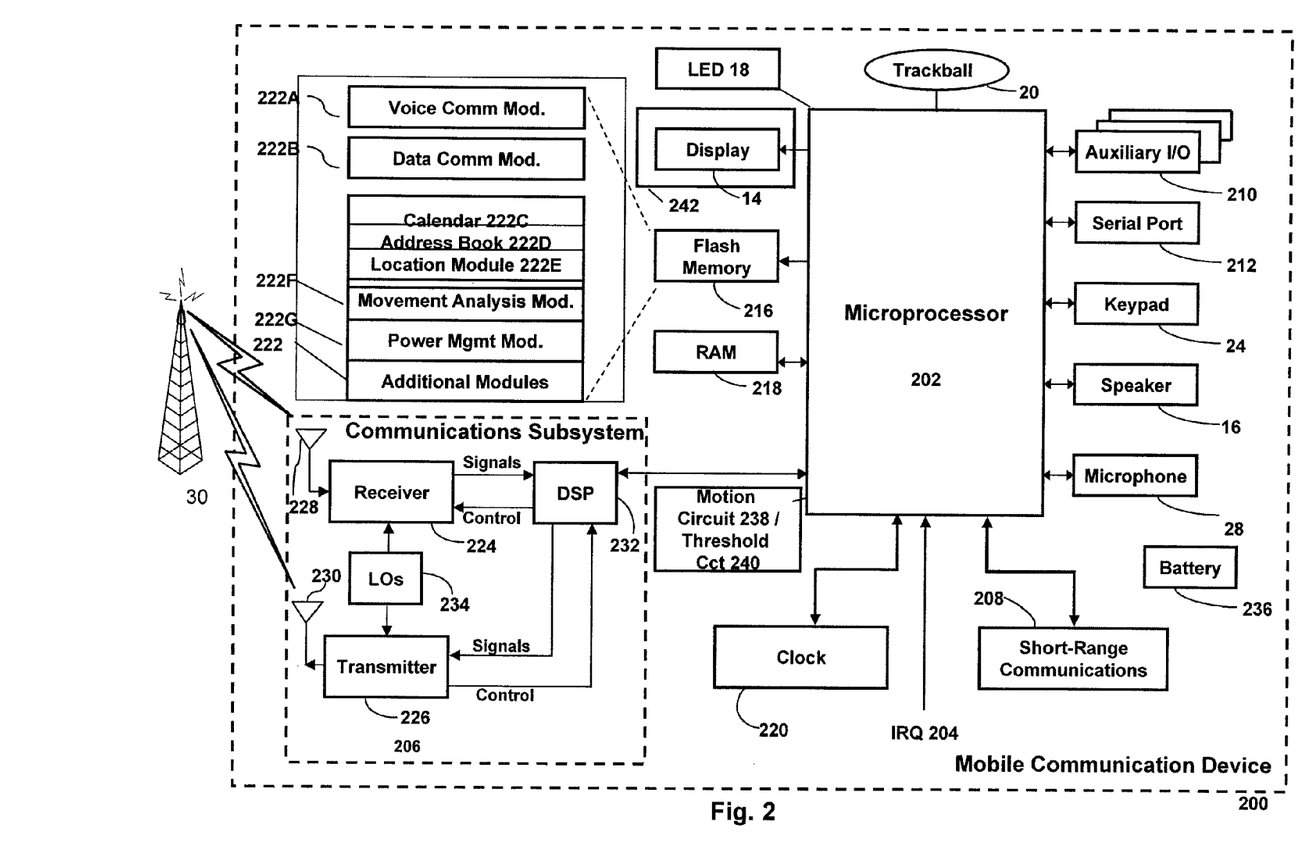
FIG. 2 is a block diagram of certain internal components and the motion detection system in device of FIG. 1.

As such, referring to FIGS. 1 and 2, some general features of a device are first provided. FIG. 1 provides general features of an electronic device for receiving electronic communications in accordance with an embodiment of the disclosure, which is indicated generally at 10. In the present embodiment, electronic device 10 is based on a computing platform having functionality of an enhanced personal digital assistant with cell phone and e-mail features. It is, however, to be understood that electronic device 10 can be based on construction design and functionality of other electronic devices, such as smart telephones, desktop computers pagers or laptops having telephony equipment. In a present embodiment, electronic device 10 includes a housing 12, an LCD 14, speaker 16, an LED indicator 18, a trackball 20, an ESC ("escape") key 22, keypad 24, a telephone headset comprised of an ear bud 26 and a microphone 28. Trackball 20 and ESC key 22 can be inwardly depressed along the path of arrow "A" as a means to provide additional input to device 10.

It will be understood that housing 12 can be made from any suitable material as will occur to those of skill in the art and may be suitably formed to house and hold all components of device 10.

Device 10 is operable to conduct wireless telephone calls and data transmissions to wireless network 30. Transmission protocols for such transmissions can follow any known wireless transmission systems such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Wireless WAN (IMS), Wireless MAN (Wi-max or IEEE 802.16), Wireless LAN (IEEE 802.11), Wireless PAN (IEEE 802.15 and Bluetooth), etc. and any others that support voice. Additionally, a Bluetooth network may be supported. Other embodiments include Voice over IP (VoIP) type streaming data communications that can simulate circuit-switched phone calls. Ear bud 26 can be used to listen to phone calls and other sound messages and microphone 28 can be used to speak into and input sound messages to device 10.

Device 10 may connect to docking station 32. Docking station 32 may be connected to a computer (not shown) and docking station may provide power and data signals to device 10 through an alternative communication connection to network 30. When device 10 is connected to docking station 32, device 10 can be placed in an operating mode that tailors activation/deactivation of certain components to take advantage of its "docked" state. When device 10 has been disconnected from docking station 32, device 10 can be placed in a different operating mode that tailors activation/deactivation of certain components to take recognize its "undocked" state. Device 10 can detect through its docking station connection (not shown) when it is docked and when it is not docked to docking station 32.

In typical use, device 10 is not connected to docking station 32 and is carried by a user on his person (or in a carried bag, purse, etc.). A user may wear or carry a holster (not shown) that provides a casing for device 10. The holster may have a belt clip to allow the holster to be attached to the user's belt. The holster may be a cover without a clip that is kept in the user's pocket, bag or purse. When device 10 is placed inside the holster, device 10 can detect that it has been "holstered". When device 10 detects that it has been holstered, it is generally inferred that device 10 is not meant to be used immediately. As such, when device 10 has been holstered, device 10 can be placed in an operating mode that deactivates certain components that are not expected to be used while in its "holstered" state. This may include turning off certain components, such as a backlight for LCD 14. When device 10 has been removed from its holster, device 10 can be placed in a different operating mode that activates certain components in recognition of its "unholstered" state. The holster may have one or more switches, magnets, metallic contact points or other features embedded therein that device 10 can detect to determine when it is holstered and when it is not holstered. Device 10 may also be considered to be notionally holstered (i.e. not in use) under certain conditions when it is not inserted into its holster, for example, when device 10 is turned off or when it is inactive for a certain period of time.

Referring to FIG. 2, functional components of device 10 are provided in schematic 200. The functional components are generally electronic, structural or electro-mechanical devices. In particular, microprocessor 202 is provided to control and receive almost all data, transmissions, inputs and outputs related to device 10. Microprocessor 202 is shown schematically as coupled to keypad 24 and other internal devices. Microprocessor 202 preferably controls the overall operation of the device 10 and its components. Exemplary microprocessors for microprocessor 202 include microprocessors in the Data 950 (trade-mark) series, the 6200 (trade-mark) series and the P4900 (trade-mark) series, all available at one time from Intel Corporation. Microprocessor 202 is connected to other elements in device 10 through a series of electrical connections to its various input and output pins. Microprocessor 202 has an IRQ input line 204 which allows it to receive signals from various devices. Appropriate interrupt firmware is provided which receives and reacts to the signals detected on the IRQ line 204.

In addition to microprocessor 202, other internal devices of the device 10 are shown schematically in FIG. 2. These include: display 14 (with its backlight 242); speaker 16; keypad 24; communication sub-system 206; short-range communication sub-system 208; auxiliary I/O devices 210; serial port 212; microphone 28; flash memory 216 (which provides persistent storage of data); random access memory (RAM) 218; internal clock 220 to track and synchronize applications and other device sub-systems (not shown). Device 10 is preferably a two-way radio frequency (RF) communication device having voice and data communication capabilities. In addition, device 10 preferably has the capability to communicate with other computer systems through networks such as the Internet.

Operating system software executed by the microprocessor 202 is preferably stored in a computer readable medium, such as flash memory 216, but may be stored in other types of memory devices, such as read only memory (ROM) or similar storage element. In addition, system software, specific device applications, or parts thereof, may be temporarily loaded into a volatile store, such as RAM 218. Communication signals received by the mobile device may also be stored to RAM 218.

Microprocessor 202, in addition to its operating system functions, enables execution of software applications on device 10. A set of software (and/or firmware) applications, referred to generally as applications 222, that control basic device operations, such as voice communication module 222A and data communication module 222B, may be installed on the device 10 during manufacture or downloaded thereafter. As well, additional software modules, which may be for instance a personal information manager (PIM) application, may be installed during manufacture or downloaded thereafter into device 10. Data associated with each application can be stored in flash memory 216.

Telephone application 222A provides an interface to allow the user of device 10 to initiate a telephone call on device 10. It also provides a GUI to store and list a record of telephone calls made, telephone calls received and voice-mail messages stored by device 10.

Email application 222B provides modules to allow user of device 10 to generate email messages on device 10 and send them to their addressees. Application 222B also provides a GUI which provides a historical list of emails received, drafted, saved and sent.

Calendar 222C tracks appointments and other status matters relating to the user and device 10. It provides a daily/weekly/month electronic schedule of appointments, meetings and events as entered by the user. Calendar 222C tracks time and day data for device 10 using processor 202 and internal clock 220.

Address book 222D enables device 10 to store contact information for persons and organizations. In particular, name, address, telephone numbers, e-mail addresses, cell phone numbers and other contact information are stored in linked records. The data is stored in non-volatile memory, such as memory 216 in device 10 in a database.

Location module 222E provides the current geographic location of device 10. In one embodiment, it receives and interprets remote GPS signals from a system of satellites to triangulate the current location of device 10, using, for example GPS modules and applications known in the art.

Movement analysis module (MAM) 222F receives data from movement module 238, converts and stores the data and analyzes it to determine when a component in device 10 should be activated or deactivated. Further details on module 222F are provided below. Power management module (PMM) 222G selectively activates and deactivates components of device 10 and provides wake up signals to microprocessor 202. Further detail is provided on these modules below.

Communication functions, including data and voice communications, are performed through the communication sub-system 206 and the short-range communication sub-system 208. Collectively, sub-systems 206 and 208 provide the signal-level interface for all communication technologies processed by device 10. Various applications 222 provide the operational controls to further process and log the communications. Communication sub-system 206 includes receiver 224, transmitter 226 and one or more antennas, illustrated as receive antenna 228 and transmit antenna 230. In addition, communication sub-system 206 also includes processing module, such as digital signal processor (DSP) 232 and local oscillators (LOs) 234. The specific design and implementation of communication sub-system 206 is dependent upon the communication network in which device 10 is intended to operate. For example, communication sub-system 206 of device 10 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Other types of data and voice (telephonic) networks, both separate and integrated, may also be utilized with device 10. In any event, communication sub-system 206 provides device 10 with the capability of communicating with other devices using various communication technologies, including instant messaging (IM) systems, text messaging (TM) systems and short message service (SMS) systems.

In addition to processing communication signals, DSP 232 provides control of receiver 224 and transmitter 226. For example, gains applied to communication signals in receiver 224 and transmitter 226 may be adaptively controlled through automatic gain control algorithms implemented in DSP 232.

In a data communication mode, a received signal, such as a text message or web page download, is processed by the communication sub-system 206 and is provided as an input to microprocessor 202. The received signal is then further processed by microprocessor 202 which can then generate an output to display 14 or to an auxiliary I/O device 210. A device user may also compose data items, such as e-mail messages, using keypad 24, trackball 20 and/or some other auxiliary I/O device 210, such as a touchpad, a rocker switch, a separate thumbwheel or some other input device. The composed data items may then be transmitted over communication network 140 via communication sub-system 206. Sub-system 206 may also detect when it is out of communication range for its remote systems.

In a voice communication mode, overall operation of device 10 is substantially similar to the data communication mode, except that received signals are output to speaker 16, and signals for transmission are generated by microphone 28. Alternative voice or audio I/O sub-systems, such as a voice message recording sub-system, may also be implemented on device 10. In addition, display 14 may also be utilized in voice communication mode, for example, to display the identity of a calling party, the duration of a voice call, or other voice call related information.

In order for device 10 to maintain a connection to network 30, device 10 may periodically need to synchronize with network 30. Synchronization may be accomplished by monitoring for, and responding to, network "ping" signals. For example, GSM and UMTS network ping signals are periodically broadcast by a network to devices that are in their broadcast regions. If device 10 is configured to operate for either of those networks, it must be set to receive the expected signals and reply to them if and when expected. In order to receive those ping signals, device 10 would need to be placed in a functional communications mode, where one or more of its communication functions and its microprocessor 202 are activated. While device 10 may be able to operate in a low power mode, however, when monitoring for the ping signal (or other expected signals), device 10 transits to a higher power mode, activates necessary functions and communication components, conducts the required monitoring and provides any necessary replies. Thereafter, device 10 may revert to a lower power mode.

Short-range communication sub-system 208 enables communication between device 10 and other proximate systems or devices, which need not necessarily be similar devices. For example, the short-range communication sub-system may include an infrared device and associated circuits and components, or a Bluetooth (trade-mark) communication module to provide for communication with similarly-enabled systems and devices.

Powering the entire electronics of the mobile handheld communication device is power source 236. Preferably, the power source 236 includes one or more batteries. More preferably, the power source 236 is a single battery pack, especially a rechargeable battery pack. A power switch (not shown) provides an "on/off" switch for device 10. Upon activation of the power switch an application 222 is initiated to turn on device 10. Upon deactivation of the power switch, an application 222 is initiated to turn off device 10. Power to device 10 may also be controlled by other devices and by software applications 222.

With some basic components of device 10 described, further detail is provided on power management features of an embodiment.

As previously noted, power management module (PMM) 222G selectively activates and deactivates components of device 10. In providing wake up signals to microprocessor 202, an interrupt routine may be initiated and an interrupt signal to IRQ line 204 may be generated to enable device 10 to be placed in one or more power modes.

A power mode can be fully on, fully off, mostly off (e.g. only minimal components activated, such as microprocessor 202) or mostly on (e.g. only backlight 242 or another component is deactivated). Power management module may also control how and when communication functions for device 10 are activated. Power management module 222G may have sensors to detect the power level of batteries 326, connections to docking stations 32, or when device 10 has been holstered or not. Power management module 222G uses signals from movement analysis module 222F and from other sensors to determine power state to place device 10 in. Further details on module 222G are provided below.

Motion detection circuit 238 and trigger circuit 240 provide systems and devices to detection movements of device 10 and to set thresholds for detectable movements. Motion detection circuit 238 may be used to wake up microprocessor 202 when it is in a low power state. Motion detection circuit 238 may include an accelerometer and a microcontroller such as a periphery interface controller (PIC) may be closely associated with the accelerometer. A single circuit board comprising the microcontroller and the accelerometer may be provided as part of motion detection circuit 238. With the microcontroller, motion detection circuit 238 may operate in several modes, including a streaming mode (where data is continually monitored and sent to other components, including microprocessor 202), an interrupt mode (which is triggered to send an interrupt signal to IRQ line 204 of microprocessor 202 and/or provide stored movement data to microprocessor 202 only if the detected movement exceeds a predetermined threshold) or a polling mode, where movement data is stored is not sent to other devices, such as microprocessor 202, until a trigger event is provided. For the interrupt mode, the threshold may be set to filter movement signals that are considered noise, but would still capture minimally acceptable movements. This interrupt mode is used to allow microprocessor 202 to remain in a lower power mode until a 'significant' movement is detected by device 10. It will be appreciated that various time and displacement parameters may be used to determine what constitutes a 'significant' movement. Such parameters may include a minimum displacement of the device in one or more directions, one or more movements within certain time parameters, etc. The thresholds for the displacement and the times are subject to determined requirements for specific situations. Threshold circuit 240 is provided to filter movement data detected by motion detection circuit 238 and may be incorporated into the microcontroller. Motion detection circuit 238 may include a MEMS (micro-electromechanical system) accelerometer including a low-g MEMS. An exemplary low-g MEM accelerometer is a LIS3L02AQ tri-axis analog accelerometer, available from STMicroelectronics of Geneva, Switzerland. Further, the accelerometer may be of almost any type, including a capacitive, piezoelectric, piezoresistive, or a gas-based accelerometer. Accelerometers sense and convert an acceleration detected from a motion (e.g. tilt, inertial, or vibration) or gravity into an electrical signal (producing a corresponding change in output) and are available in one, two or three axis configurations. Accelerometers may produce digital or analog output signals. Movement data from motion detection circuit 238 is provided to movement analysis module 222F. Movement analysis module 222F provides some processing of the data generated by motion detection circuit 238.

In one embodiment device 10 can cycle through a normal operating mode to a low-power mode and back to a normal operating mode. In the normal operating mode for device 10, PMM 222G monitors the current state of usage of device 10. When device 10 is detected as being inactive (e.g. no activation of from keypad 24, device 10 has been holstered or no messages received) after a predetermined amount of time (e.g. 5 minutes), then the PMM 222G selectively shuts down an element or places an element of device 10 into a lower power consumption mode. For example, microprocessor 202 may be placed in a "slow clock" mode, wherein the clocking signal for the microprocessor is slowed, thereby causing device 10 to operate slower and conserve battery power. Alternatively, backlight 242 for display 14 may be turned off. One or more elements can be selectively powered down. When device 10 is in a low-power mode, device 10 can subsequently be re-activated into the normal power or higher-power mode.

With the motion detection circuit 238, PMM 222G and MAM 222F, an embodiment can place device 10 in a lower power mode and then analyze movement data of device 10 to determine when a predetermined deliberate movement of device 10 has been detected that indicates an intent to use device 10. One exemplary expected movement is the picking up of device 10 from a table. It can be seen that the expected movement has several components: a first resting component, where the device is "resting" on the table; a second initial movement component, where the device has been picked up from the table and an initial upward acceleration of device 10 is detected, a third deceleration component as upward movement of the device is slowed to a stop, and a fourth stationary component where the device is held (relatively stationary) and is ready for use or review by the user. Mapping a power modes against the movement components, a low power mode may be associated with the first resting component, and one or more intermediary power mode(s) (or even the low power mode) may be associated with the second and third components. Finally a higher power mode may be associated with the last component, as the user may want to use the device as he is holding it.

An embodiment utilizes the following elements to manage transitions through the power modes of device 10 through motion detection circuit 238, its microcontroller and routines operating on the microcontroller, threshold circuit 240, microprocessor 202 and other components in device 10. In particular, the elements collectively monitor the state of activation of device 10, monitor signals received from motion detection circuit 238, determines a state of operation of device 10, and then selectively activates components of device 10. With the different power modes provided for device 10, several of the lower power modes will have microprocessor 202 operating in a lower power state. Other power modes have microprocessor 202 operating in a normal, higher power state. In determining a state of operation of device 10, an embodiment provides a "lockstep" state for device 10. The lockstep mode provides movement data to microprocessor 202 only when it is operating in a higher power state, where microprocessor is fully or effectively fully powered. This synchronization with the data analysis and the state of microprocessor 202 ensures that microprocessor 202 is actively powered and can process the movement data. With the lockstep state, the movement data is provided to microprocessor 202 only when microprocessor 202 is already in a higher power state.

Figure 3:
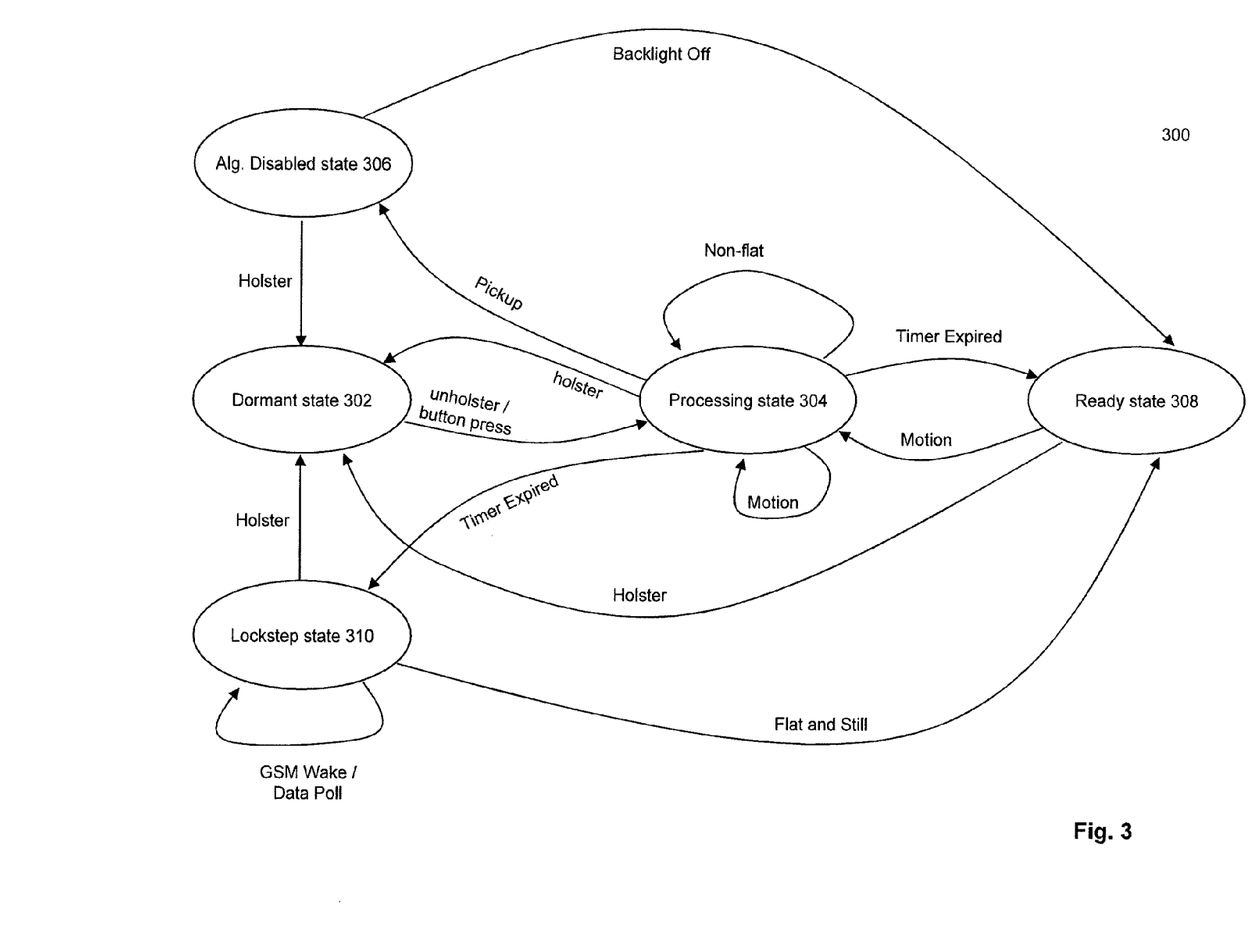
FIG. 3 is a state diagram of functions performed in processing motions detected by the device of FIG. 1.

Referring to FIG. 3, further detail on transiting among power states by device 10 is provided. In particular, state diagram 300 provides an exemplary progression of power states that device 10 transits through when it is managing activation of components in device 10. Through the states, a combination of microcontroller, PPM 222G and MAM 222F transits in, to and through various local states as they receive data and signals, such as movement data or activation signals from each other and other components in device 10. Transitions are made between states based on inputs or events. Arrows show transitions between states. Text about the arrows shows the inputs or events that caused the transition. When a transition is made, in addition to moving a new state one or more actions may be implemented. Overall, device 10 processes the signals to determine whether to activate or deactivate a component in device 10 or whether to wait for another event to activate or deactivate a component.

For an embodiment, four main states for the routine on the microcontroller are provided: dormant state 302, processing state 304, algorithm disabled state 306, ready state 308 and lockstep state 310. First and second timers are provided to track how long to wait for expected movement data for the routine on the microcontroller.

Further details are provided on exemplary transitions among power states for device 10. To begin, for the sake of describing diagram 300, device 10 is assumed to be in dormant state 302. Dormant state 302 is entered when device 10 has been holstered, docked or another power-down event (e.g. it was turned off). Dormant state 302 represents a lower power state for device 10. One or more of motion detection circuit 238 (and its microcontroller) and other components may be in a low power state and backlight 242 may be deactivated. In one embodiment, the only exit path from state 302 is an activation event, such as unholstering/undocking of device 10, detection of a button/screen press, etc. Other embodiments may have connections to other states. Once an activation event is detected, motion detection circuit 238 (and its accelerometer and microcontroller) are activated. Movement data from motion detection circuit 238 may be provided to microprocessor 202. Then, a first timer is started to track the duration of the movement. The movement may be incidental, as such, the first timer may be set to expire after a fairly short time, such as between approximately 1 and 5 seconds. One embodiment sets the first timer to 1 second. Other time values may be used. Then, the process moves from dormant state 302 to processing state 304.

In processing state 304, the accelerometer (and the microcontroller) in motion detection circuit 238 are placed in a "stream" mode to provide a constant stream of movement data for the duration of the first timer. While in this stream mode, data from motion detection circuit 238 is provided continuously to microprocessor 202. In processing state 304, the motion streaming motion is continuously monitored and provided to microprocessor 202. It will be seen that streamed data provides more frequent data reports than interrupt-based reports. As such, streamed data may provide more frequent data for analysis in a given timeframe. As long as a further movement is detected, then the first timer is reset. If the motion detection circuit provides movement data that indicates that device 10 has been moved to a "not flat" position while in "stream" mode, then a second timer is started. The second timer's purpose is to bound the time window for the "non flat" position to evolve into a position where device 10 is intended to be used. For example entry into the "non flat" position followed by a long period of random motion is more indicative that device 10 may be moving unintentionally where it is NOT intended to be used. As such, the second timer may be set to expire after a longer time, such as between approximately 3 and 15 seconds. One embodiment sets the second timer to 10 seconds. Other time values may be used. The second timer can only be reset within the processing state 304 upon first detection of "non flat" orientation. Also, as long as a further movement is detected, then the first timer is reset.

While in processing state 304, if motion detection circuit 238 provides data to the routine on the microcontroller indicating that device 10 is currently not flat then this indicates that device 10 is being moved. Processing state 304 provides a module that evaluates subsequent movement data after an initial indication that device 10 may be activated. In one movement analysis scheme, a pick up movement (from a presumed stationary position) is deemed to indicate that device 10 is being used. Processing state 304 evaluates detected movements to determine whether or not the movements match a predefined movement pattern for a pick up action. When a further movement is detected, processing state 304 starts a second timer providing a time window to determine whether the further movement matches the pick up action. If the pickup motion is detected within the second timer, this indicates that the device 10 is being used. As such, the process causes one or more disabled components to be activated (e.g. backlight 242 or communications module 230) and transits from processing state 304 to algorithm disabled state 306. If the pickup motion is not detected within the second timer, this indicates that the device 10 is still being moved, but that no predetermined activation movement profile has been detected. As such, the routine on the microcontroller transits from processing state 304 to lockstep state 310 for processing of further movement data, in a lower power mode. Microcontroller for circuit 238 is set to a "lock step" polling mode.

If a motion is detected in processing state 304, then the first timer is reset. If the first timer elapses, then the routine on the microcontroller transits from state 304 to ready state 308 and motion detection circuit 238 is placed in an interrupt mode.

Processing state 304 is entered by either: an activation event detected from dormant state 302 or a motion detected from ready state 308.

Turning now to algorithm disabled state 306, this state effectively disables the movement monitoring algorithm, as it has been determined from earlier processes that device 10 is being used. As such, once in state 306, the motion detection algorithm may be deactivated or data from motion detection circuit 238 may be ignored. While in state 306, if a deactivation event is detected (e.g. holstering, docking or turning off of device 10, extended period of time of non-use of device, extended period of time of non-movement of device etc.), then motion detection circuit 238 is placed in a dormant mode (by moving the second accelerometer to a lower power state) and state 306 transits to dormant state 302. While in state 306, if the backlight 244 fades then state 306 transit to ready state 308 and motion detection circuit 238 is placed in an interrupt mode. The fade (or deactivation) of backlight 244 may be provided upon a preset condition (e.g. expiration of a timer, activation of a key, etc.). Other conditions may be used to transit from state 306 to ready state 308.

When device 10 is in state 306 and an event occurs that places device 10 into a lower power mode, device 10 may need to re-activate the motion monitoring algorithm. For example, backlight 242 may turn off while device 10 is in state 306. At that instance, it may be useful to monitor for new movements for device 10. As such, device 10 transits to ready state 308. Microcontroller for motion detection circuit 238 is moved to the interrupt mode where it reports only movement signals that exceed a predetermined threshold. In one embodiment, it is sufficient to process movement signals in the interrupt mode (i.e. movement data from a stream mode may not be needed). The threshold may be different from other thresholds or may be the same. Ready state 308 provides a monitoring process to detect a first motion that may signify a notable movement of device 10 (subject to the threshold). Ready state 308 is reached by any of: backlight 242 fading or being turned off from algorithm disabled state 306, expiry of the first timer from processing state 304 or satisfaction of device 10 being "flat and still" in lockstep state 310 (described later).

From ready state 308, if a motion is detected that exceeds the predefined threshold, then device 10 transits to processing state 304. Also the first timer is reset and microcontroller for motion detection circuit 238 is placed in a data streaming mode, so that more or all data from circuit 238 is analyzed. From ready state 308, if a holstering, docking or deactivation action is detected, then device 10 transits to dormant state 302 and motion detection circuit 238 is placed in a dormant mode.

Diagram 300 shows one additional state, lockstep state 310. Lockstep state 310 provides a movement monitoring state that waits to perform its actions for when microprocessor 202 is already active, performing other tasks. To elaborate, during the power management processes executed by device 10, microprocessor 202 may be in a dormant, or semi dormant state. An action may be required that requires execution by microprocessor 202. With lockstep state 310, instead of forcing microprocessor 202 to its higher power state to process the action, lockstep state 310 waits until microprocessor 202 is independently brought to the higher power state from a separate event and then has microprocessor 202 process the action. Device 10 may transit between a normal operating mode and a low power mode while processing movement data from motion detection module 238. If device 10 is in state 310, device 10 will wait until microprocessor 202 becomes re-activated before having microprocessor execute the action controlled by state 310. One exemplary event that causes device 10 to independently re-activate microprocessor 202 is to monitor for a ping signal (such as a GSM or UMTS ping signal) from network 30. A ping signal for a GSM or UMTS network may be expected once between approximately every 0.5 to 2 seconds. Other synchronization events may be used. As such, in state 310, timing of execution of data polling for motion detection circuit 238 is synchronized to align with intervals where microprocessor 202 has been re-activated in order to receive and process data relating to a network ping signal. As such, additional processes to specifically re-activate microprocessor 202 are not necessarily required by state 310. In particular when device 10 is expected to receive a network ping message, state 310 causes motion detection circuit 238 to upload its movement data to microprocessor 202.

Lockstep state 310 is entered from processing state 304, after a movement has been detected, but that does not match a pick up signature. As such, the second timer for the movement has expired.

From lockstep state 310, if device 10 has been placed in a resting position, the device 10 returns to ready state 308 and the microcontroller for circuit 238 is placed in an interrupt threshold mode. For example, if a resting position is defined as device 10 being "flat and still", when motion detection circuit 238 provides signals that match a profile of a predetermined movement indicating that device 10 is "flat and still" then device 10 transits to ready state 308 and the accelerometer of motion detection circuit 238 is placed in an interrupt data gathering mode.

From state 310, if a holstering, docking or deactivation action is detected, then the routine on the microcontroller transits to processing state dormant state 302 and motion detection circuit 238 is placed in a dormant mode.

The labels provided for the states in FIG. 3 are not meant to be limiting to the functions described for the states. The labels provide convenient distinguishing titles for the states, but it will be appreciated that other titles for the states may be used. With the description of states 302, 304, 306, 308 and 310 it will be seen that other elements in device 10 may be selectively activated and deactivated as device 10 progresses through various power states. It will be appreciated that in other embodiments a larger or smaller number of states may be provided compared with state diagram 300. States may be combined or further subdivided. Additional states with different functions may be added. Some functions may be deleted. However, the components of the lockstep state 310 where certain functions are conducted only when device 10 is placed (temporarily) in a higher power mode is preferably maintained. An embodiment may combine one of more functions of the ready, processing, algorithm deactivate states into a representative state that operates with functions of another lockstep state.

In other embodiments, processes in lockstep state 310 may be used to monitor or control other features of device 10, such as activation of one or more communication functions and/or modules on device 10. Additional timed communication transmissions may also be controlled by provided in lockstep state 310. The control signals generated from the processes may be used to control microprocessor 202 or other components in device 10 directly.

As noted FIG. 3 shows a state diagram for transiting power modes for device 10 for an expected movement of picking device 10 upward from a table. Other signatures for other movements which are deemed to represent an activation action may be mapped and transformed into a state diagram. For example, a detected movement of a predetermined notable displacement in one or more directions from a resting or near resting state may be used. Alternatively or additionally, a detected stopping of movement from a predetermined detected movement of a notable displacement may be used. Alternatively, a movement may be tied to detection of another event (e.g. activation of a feature or key on device 10). Alternatively or additionally, other actions may be mapped to turn off specific components.

Any predetermined gesture detected by circuit 238 may be required to activate device 10, such as a quick "snap" movement in a predetermined direction of device 10 or movement of device 10 in a circular pattern. Any gesture can be broken down into a series of sequential notable components and analysed with comparable analysis algorithms provided in processing state 304.

A predetermined gesture can include a combination of movement vectors in the x, y and z Cartesian coordinates. Alternatively, the predetermined movement may consider movement data in a select set of Cartesian directions (e.g. z axis only, x and y axes only, etc.).

Figure 4:
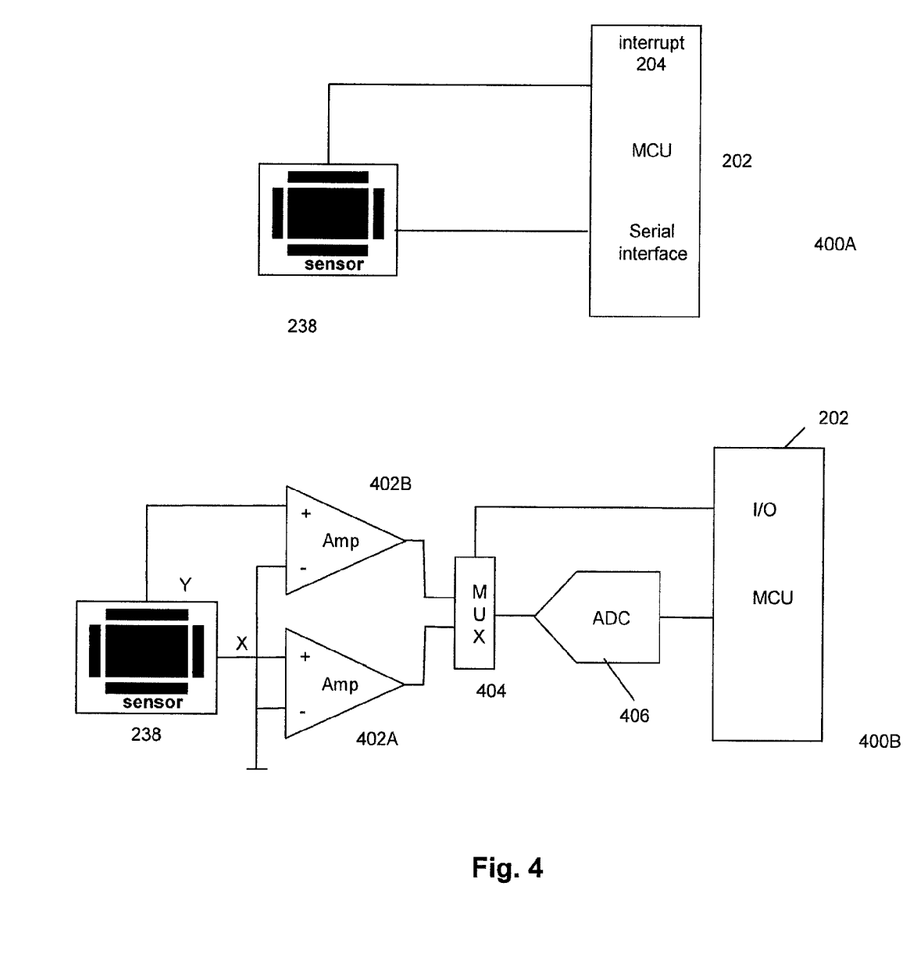
FIG. 4 is a block diagram of two motion detection systems of the embodiment of FIG. 1.
Figure 5:
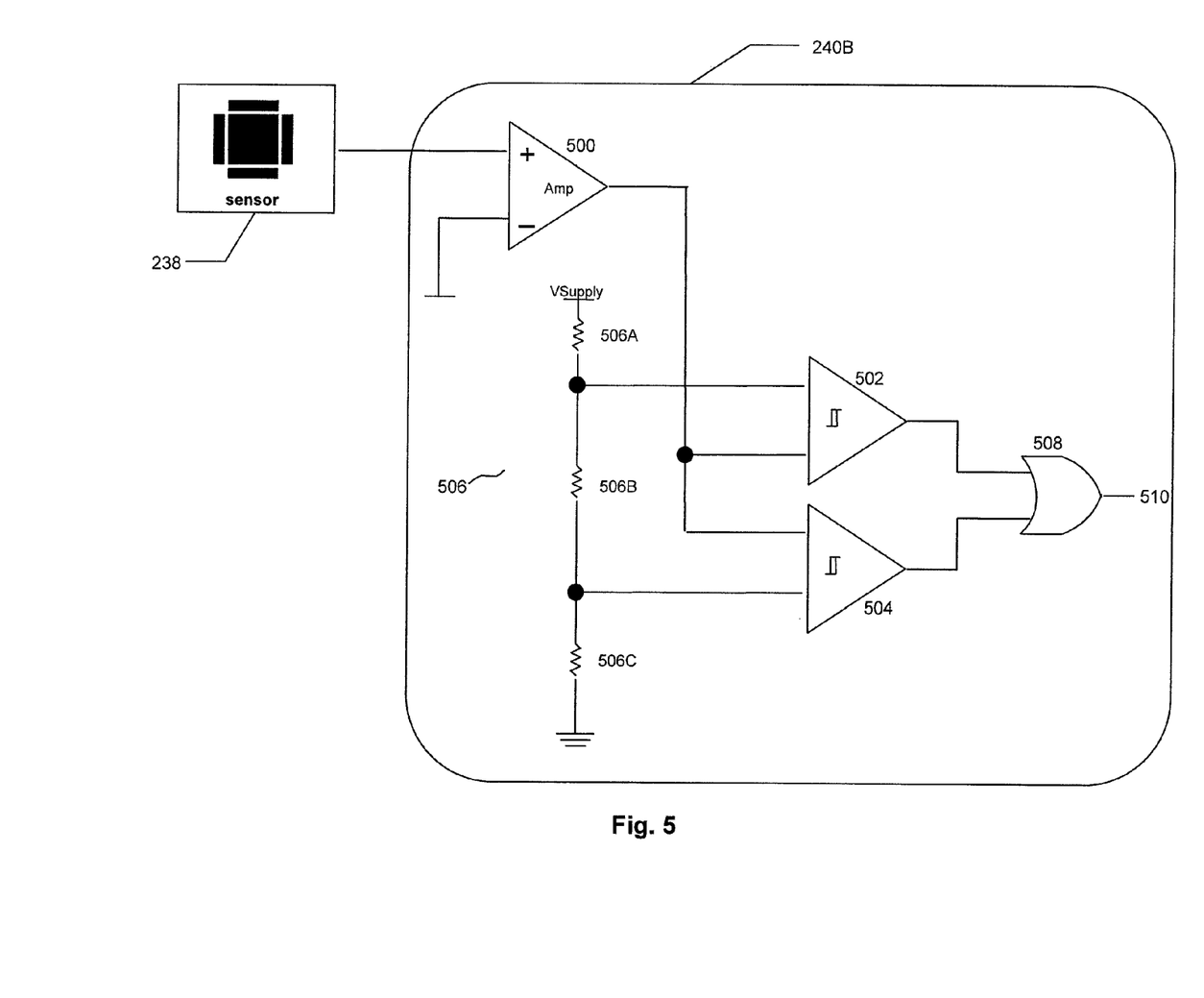
FIG. 5 is a block diagram of an alternative motion detection system the embodiment of FIG. 1.

Referring to FIG. 4, one circuit 238A is shown for motion detection circuit 238. The accelerometer for circuit 238 can be oriented such that its output detects movement along a desired axis (e.g. 'Z' axis detecting when device moved vertically). Additional axes may be monitored by replicating circuit 238A for each additional axis. Briefly, the output of the accelerometer for circuit 238 is provided to buffer amp 400. The output of buffer amp 400 is provided in tandem to comparators 402 and 404. The other inputs of comparators 402 and 404 are taken from different taps on resistor ladder 406, comprising resistors 406A, 406B and 406C. Comparators 402 and 404 each produce upper and lower limit comparison signals for the output of the accelerometer for circuit 238. If the value of the signal from accelerometer is either below the upper limit set by the parameters of comparator 402 (comparing the signal from the accelerometer against its tap from the resistor ladder 406) or above the lower limit set by the parameters of comparator 404 (comparing the signal from the accelerometer against its tap from the resistor ladder 406) then OR gate 408 generates an output signal for circuit 238. It will be appreciated that the limits can be used to define a range of signals detected by sensor 238 representing when device 10 is either stationary (e.g. at rest) or being moved.

The accelerometer in circuit 238 may detect positive and negative accelerations along one or more axes. If the accelerometer is a digital device, it preferably produces a positive range of values, for example between 0 and 255, representing all detected up and down movements. In that example, the rest reading for the accelerometer for device 10 may be a value around 127. As such, up and down movements of device 10 would cause readings to move above and below the value of 127. If a movement in either direction is sufficient to trigger one of comparators 402 or 404, the data from sensor 238 would have to be outside the tolerance window of the rest reading. Thus, OR gate 408 would generate a HIGH when the output signal from the accelerometer is outside the tolerance window. It will be appreciated that the limits of 1 g (namely, 1 gravity force) can be used with a tolerance buffer to compensate for noise in the signals. Other g forces may be used. A comparable analog circuit may be provided if the sensor is producing a voltage signal. In other embodiments, positive and negative values produced by the accelerometer may be analyzed.

It will be appreciated that other circuits using different combinations of sensors and triggering components and threshold detectors may be used to provide functionalities of circuit 238. In other embodiments, a single comparator can be used to perform comparisons.

In other embodiments, motion detection circuit 238 may be substituted with a different device, such as a spring-loaded switch, a keypad, an infrared sensor, a capacitive touch sensor, a proximity sensor, a location sensor, a presence detector, a light sensor or any other device which can generate a signal responsive to a condition predetermined to indicate that device 10 is about to be re-activated. It is preferable that the device have low quiescent power draw characteristics. Further, system notifications, time/date, or alarms may be used to trigger power to be enabled to the input sub-system indicating device reactivation. It will be further appreciated that other motion sensor circuits known in the art may be used, as appropriate.

In an embodiments, the state diagram of FIG. 3 may be implemented in circuits, PLDs, PLAs, software, firmware or other systems known in the art. Further, other types of trigger circuits employing more or less input signals, as required, may be provided in other embodiments.

When a wake-up signal is provided to IRQ line 204 of microprocessor 202, microprocessor 202 activates the associated interrupt routine. The interrupt routine contains instructions to re-activate microprocessor 202 and initiate other processes and routines to move device 10 from its current power-up state to another, higher-power up state. The routine is encoded as software or firmware and may be stored in an appropriate memory location in memory 216. The next power state may be a full-power state or it may be an enhanced power state. Further progression up or down from the next power state may be dependent on further detection of use of device 10 by PMM 222G or other modules or circuits.

It will be appreciated that modules operating on device 10 and other applications in the embodiments can be implemented using known programming techniques, languages and algorithms. The titles of the modules are provided as a convenience to provide labels and assign functions to certain modules. It is not required that each module perform only its functions as described above. As such, specific functionalities for each application may be moved between applications or separated into different applications. Modules may be contained within other modules. Different signalling techniques may be used to communicate information between applications using known programming techniques. Known data storage, access and update algorithms allow data to be shared between applications. It will further be appreciated that other applications and systems on device 10 may be executing concurrently with any module on the same device or on other devices. As such, one or more aspects of any modules may be structured to operate in as a "background" application on device 10, using programming techniques known in the art. Embodiments shown as state diagrams may be expressed in flow charts, pseudo code or other programming conventions.

As used herein, the wording "and/or" is intended to represent an inclusive-or. That is, "X and/or Y" means X or Y, or both X and Y.

The present disclosure is defined by the claims appended hereto, with the foregoing description being merely illustrative of embodiments of the present disclosure. Those of ordinary skill may envisage certain modifications to the foregoing embodiments which, although not explicitly discussed herein, do not depart from the scope of the disclosure, as defined by the appended claims.

The invention claimed is:

1. A method for controlling activation of a component on an electronic device, comprising:
   in a movement processing state, monitoring a motion detection circuit in the electronic device for a movement signal indicating a movement of the electronic device, analyzing the movement signal and if the movement signal matches a profile for an activation movement for the electronic device then activating the component on the electronic device;
   progressing to a lockstep state from the movement processing state when the movement signal does not match the profile within a timer condition; and
   in the lockstep state,
      initially operating the electronic device in a first power state where movement data relating to the movement signal is not provided to a microprocessor in the electronic device; and when the electronic device is expected to be monitoring for receipt of a synchronization signal from a communication network
operating the electronic device in a higher power state compared to the first power state,
monitoring for the movement signal,
providing the movement data to the microprocessor, and
when the synchronization signal has been received, placing the electronic device in a second power operating state consuming less power than the first power state.

2. The method for controlling activation of a component on an electronic device as claimed in claim 1, further comprising
prior to being in the first power state, monitoring for an activation event that represents an activation activity for the electronic device in a dormant state.

3. The method for controlling activation of a component on an electronic device as claimed in claim 2, wherein the dormant state had been entered when the electronic device was either turned off, placed in a holster or connected to a docking station.

4. The method for controlling activation of a component on an electronic device as claimed in claim 2, wherein the activation event is one of activation of a key on the electronic device, detection of removal of the electronic device from a holster or detection of removal of the electronic device from a docking station.

5. The method for controlling activation of a component on an electronic device as claimed in claim 1, wherein the profile for the activation movement is an upwards movement of the electronic device from a resting position.

6. The method for controlling activation of a component on an electronic device of claim 1, further comprising:
after activating the component on the electronic device, in a monitoring-disabled state monitoring for deactivation of the component; and upon detection deactivation of the component, setting the motion detection circuit to send the movement data only when the movement data exceeds a predefined threshold.

7. The method for controlling activation of a component on an electronic device as claimed in claim 1, wherein the component is a backlight for a display on the electronic device.

8. The method for controlling activation of a component on an electronic device of claim 5, further comprising in the movement processing state:
after setting the motion detection circuit to send the movement data only when the movement data exceeds a predefined threshold and monitoring for the movement data detected by the motion detection circuit;
upon detecting a movement that exceeds the predefined threshold, monitoring for movement data detected by the motion detection circuit that matches the profile for the activation movement for the electronic device; and
if no match of the profile for the activation movement for the electronic device is detected within a timeframe and no signal to deactivate the electronic device is received, then monitoring for additional movement signals for the electronic device and providing data relating to the additional movement signals at an instance where the microprocessor is expected to be operating at in a non-low power operating mode.

9. The method for controlling activation of a component on an electronic device of claim 5, further comprising:
after detecting deactivation of the component, in a ready state monitoring for an initial movement of the electronic device and setting the motion detection circuit to send the movement data only when the movement data exceeds a predefined threshold.

10. The method for controlling activation of a component on an electronic device of claim 9, further comprising from the ready state:
after detecting the initial movement of the electronic device, setting the motion detection circuit to stream the movement data for a period of time to the microprocessor; and
moving to the movement processing state.

11. A power management system for an electronic device, comprising:
a microprocessor;
a motion detection circuit having a microcontroller;
a power management software operating on the electronic device to operate in a plurality of states to activate a component on the electronic device, the plurality of states comprising:
a movement processing state, for monitoring the motion detection circuit for a movement signal indicating a movement of the electronic device, for analyzing the movement signal and if the movement signal matches a profile for an activation movement for the electronic device then for activating the component on the electronic device; and
a lockstep state entered from the movement processing state when the movement signal does not match the profile within a timer condition, the lockstep state
for initially operating the electronic device in a first power state where movement data relating to the movement signal is not provided to the microprocessor, and
when the electronic device is expected to be conducting a network operation relating to a network in communication with the electronic device, for operating the electronic device in a higher power state compared to the first power state, for monitoring for the movement signal and for providing the movement data to the microprocessor.

12. The power management system as claimed in claim 11, wherein the movement data is provided with a request signal to an interrupt input line of the microprocessor when the network operation is monitoring for receipt of a synchronization signal from the network.

13. The power management system as claimed in claim 11, wherein the network operation is monitoring for a receipt of a synchronization signal from the network.

14. The power management system as claimed in claim 11, wherein the power management software:
initiates commands to the microcontroller to provide the movement data either without filtering or with filtering depending on what mode the power management software in currently operating in.

15. A method for controlling activation of a component on an electronic device, comprising:
monitoring a motion detection circuit for a signal indicating a movement of the electronic device;
analyzing the movement of the electronic device;
when the movement matches a profile for an activation movement for the electronic device activating a component on the electronic device;
when the movement does not match the profile within a timer condition
initially operating the electronic device in a first power state where movement data relating to the movement is not provided to the microprocessor;

when the electronic device is expected to be conducting a network operation relating to a network in communication with the electronic device, operating the electronic device in a higher power state compared to the first power state;

monitoring for the movement and providing the movement data to the microprocessor; and after conducting the network operation placing the electronic device in second power operating state, the second power operating state consuming less power than the first power operating state; and when the electronic device is in a dormant state, prior to the monitoring for the signal indicating the movement of the electronic device, monitoring for an activation event that represents an activation activity for the electronic device, the dormant state being entered from when the electronic device was either turned off, placed in a holster or connected to a docking station.

16. The method for controlling activation of a component on an electronic device as claimed in claim 15, wherein the activation event is one of activation of a key on the electronic device, detection of removal of the electronic device from a holster or detection of removal of the electronic device from a docking station.

17. The method for controlling activation of a component on an electronic device as claimed in claim 15, wherein the profile for the activation movement is an upwards movement of the electronic device from a resting position.

* * * * *